United States Patent [19]

Riggert

[11] Patent Number: 4,850,566
[45] Date of Patent: Jul. 25, 1989

[54] SQUEEZABLE CLOSURE VALVE FOR A FLUID-CONDUCTING CONDUIT

[75] Inventor: Eckhard Riggert, Ovendorf, Fed. Rep. of Germany

[73] Assignee: Drägerwerk Aktiengesellschaft, Lübeck, Fed. Rep. of Germany

[21] Appl. No.: 278,840

[22] Filed: Dec. 2, 1988

[30] Foreign Application Priority Data

Dec. 9, 1987 [DE] Fed. Rep. of Germany ....... 3741665

[51] Int. Cl.⁴ .............................................. F16K 7/06
[52] U.S. Cl. ......................................... 251/7; 138/45; 138/46; 251/121
[58] Field of Search ................. 251/4, 5, 7, 8, 611, 251/121, 205; 138/45, 46

[56] References Cited

U.S. PATENT DOCUMENTS

| | | | |
|---|---|---|---|
| 2,314,767 | 1/1943 | Burrell | 251/8 |
| 2,573,712 | 11/1951 | Kallam | 251/5 |
| 2,706,612 | 4/1955 | Ratelband | 251/5 |
| 3,298,391 | 1/1967 | Savage | 251/5 |
| 3,445,085 | 5/1969 | Eckel et al. | 251/5 |
| 3,952,773 | 4/1976 | Hahn | 251/5 |
| 4,023,772 | 5/1977 | Ratelband | 251/5 |
| 4,310,140 | 1/1982 | Boomer et al. | 251/5 |

FOREIGN PATENT DOCUMENTS

| | | | |
|---|---|---|---|
| 223736 | 9/1959 | Australia | 251/8 |
| 0029396 | 5/1981 | European Pat. Off. | 251/5 |
| 2258104 | 3/1974 | Fed. Rep. of Germany | 251/4 |
| 747066 | 6/1933 | France | 251/7 |
| 0004629 | 1/1980 | Japan | 251/5 |
| 6411144 | 3/1965 | Netherlands | 251/5 |

Primary Examiner—George L. Walton
Attorney, Agent, or Firm—Walter Ottesen

[57] ABSTRACT

The invention is directed to a valve wherein the valve closure body includes two bracing elements lying in contact engagement with the inner wall surface of the wall casing of a conduit. The two bracing elements are disposed in spaced relationship to each other so that this spacing defines a squeeze zone at which a squeezing pressure can be applied. The squeeze zone has a length which corresponds approximately to the wall spacing within the sleeve. When the elastic wall casing of the conduit is squeezed in the squeeze zone, a portion of the casing deflects to allow passage of a fluid through the conduit.

6 Claims, 1 Drawing Sheet

SQUEEZABLE CLOSURE VALVE FOR A FLUID-CONDUCTING CONDUIT

FIELD OF THE INVENTION

The invention relates to a valve mounted in a conduit having a wall casing made of elastic material. The wall casing is in sealing contact engagement with a peripheral surface region of a valve closure body. The application of a squeezing force to the conduit at the location of the valve closure body causes the wall casing to deflect out and lift away from a portion of the peripheral surface region thereby interrupting the seal and allowing fluid to flow past the valve closure body.

BACKGROUND OF THE INVENTION

Valves of the kind described above are used for blocking and opening gas or liquid conduits such as in connection with a known pipetting bulb for drawing liquid by suction in pipettes. Such pipette bulbs are sold in the Federal Republic of Germany by Rudolf Brand GmbH & Co. under product No. 253 00. The known pipetting bulbs have suction and ventilating valve bodies in the form of spherical valve bodies mounted in corresponding elastic suction and ventilating conduits. The particular conduit lies as a casing about a valve ball and sealingly closes the latter about its periphery. By partially squeezing the casing against the hard surface of the valve ball, the casing deflects in response to the pressure force and lifts off of the portion of the valve ball which is not subjected to pressure. In this way, a through-flow path is provided to allow the fluid to pass.

The known valves can only be actuated manually because the squeezing force must be applied at the periphery of the valve ball lying against the inner wall surface of the wall casing. A squeezing pressure applied ahead or behind of this periphery (large circle of the valve ball) leads only to an intensified closure of the conduit. Accordingly, the suitable location on the conduit for applying the squeezing pressure must first be found by a skilled hand and this must be preceded by feeling the wall casing with the fingers to find the correct location.

However, in many applications, it is necessary that the valves not be actuated manually since the hands must remain free for other work. An example of such an application is when the valve is within a drinking line for taking up liquid nourishment or medicine by the wearer of a protective suit and/or of a hood. This can, for example, be necessary for a pilot during a flight or for a wearer of a protective suit or of a protective mask while present in a poisonous or contaminated atmosphere.

Such an application is described in French Pat. publication No. 747,066. In the arrangement described in this publication, the valve is disposed outside of the protective mask and must be actuated manually. Damage to the hose downstream of the valve would lead to an unwanted penetration of contaminants into the enclosed space of the mask. A placement of the valve within the inner space of the mask would make its actuation impossible.

SUMMARY OF THE INVENTION

It is an object of the invention to provide a valve of the kind described above which is so improved that it can be easily actuated manually even by inexperienced persons and without assistance.

The valve of the invention is for a fluid-conducting conduit defining a longitudinal axis and having a wall casing made of elastic material. The wall casing has inner and outer wall surfaces and the valve includes: two bracing elements arranged in spaced relationship to each other along the axis; each of the bracing elements having a peripheral surface region in contact engagement with the inner wall surface; and, the bracing elements being spaced from each other a predetermined spacing distance to define a squeeze zone so as to cause the wall casing to deflect away from at least one of the peripheral surface regions in response to a squeeze force applied to the outer wall surface of the wall casing in a direction transverse to the longitudinal axis thereby forming a pass-through opening to allow fluid in the conduit to pass the valve.

The advantage of the invention is seen essentially in that a wider squeeze zone is made available between the bracing elements at which the wall casing can be easily squeezed together manually. It is now no longer necessary to find a peripheral zone around the valve closure body which is as linear as possible. Even slight deviations from the center of the squeeze zone cause the valve to open.

For the application in the hood of a protective suit, the valve can be mounted in the interior of the hood in the form of an end piece of a feed line for drawing in liquid nourishment via suction, for example. In this way, the valve can be opened while at the same time the nourishment can be drawn in via suction. The squeezing zone is wide enough for this purpose that it can be palpated by the mouth and the teeth and can be pressed together by a biting action. By mounting the valve at the end of the feed line, the latter then also remains seal-tight in the event that it is damaged in a region outside of the hood.

It is especially advantageous to configure the two bracing elements as respective circular discs and to connect these discs to each other with a strut. A dumbbell-shaped closure body of this kind can be simply positioned in any desired position of a conduit segment. By pressing the walls of the conduit together within the squeeze zone, the strut defines an abutment so that the conduit can not be inadvertently pressed to the extent that it can no longer assume its initial position after the squeezing force is removed.

According to still another advantageous embodiment of the invention, the bracing element which is disposed upstream of the other one of the bracing elements can be provided with an aperture so that the chamber between the bracing elements always remains filled with fluid.

The bracing element provided with the aperture can be seated in a recess of the wall casing so as to provide a fixed position for the valve body within the conduit.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
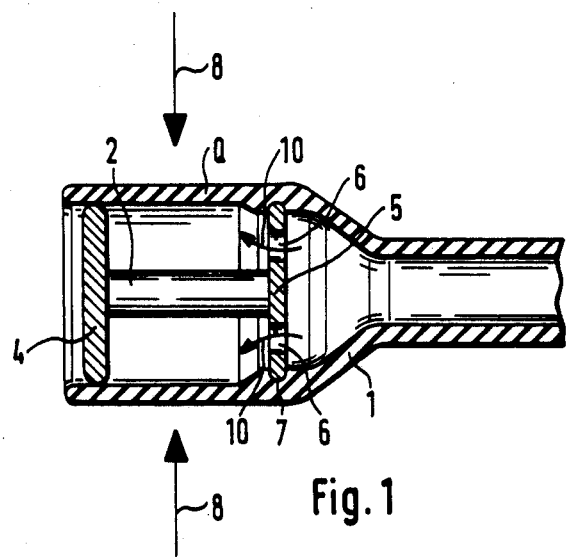
FIG. 1 is a side elevation view, partially in section, of a conduit segment having a valve according to the invention mounted therein; and, FIG. 2 is a schematic representation of the end of the conduit wherein the conduit segment is shown with a squeezing pressure force applied.

FIG. 1 shows the end of a hose-like elastic wall casing constituting a conduit segment for conducting a fluid. A dumbbell-shaped closure body is recessed in place inside the casing 1 and is made up of two circular disc-shaped bracing elements (4, 5) connected to each other by a strut 2. The flow direction of a fluid conducted through the casing is indicated by flow arrows 10. Bracing element 5 is located upstream and includes aperture means in the form of perforations 6 and is held in a recess 7 in the casing 1. Bracing element 4 is disposed downstream and lies with its periphery in seal-tight contact engagement with the inner wall surface of the casing 1 thereby preventing a further flow of the fluid. The strut 2 with its length defines a squeezing zone Q of the casing 1 between the bracing elements (4, 5).

Figure 2:
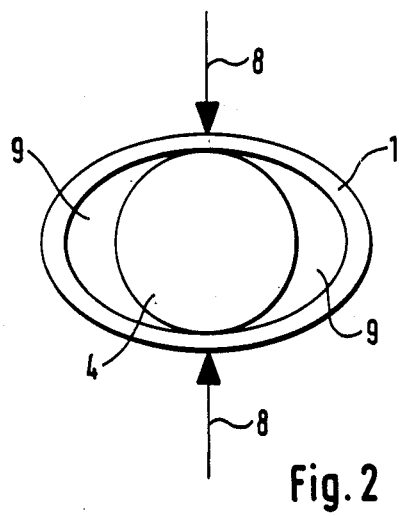

In order to open the valve, the casing 1 is pressed within the squeeze zone Q in the direction of opening arrows 8 so that the casing wall deflects under the force of the pressure and forms elliptical bulges 9 as shown in FIG. 2. In the embodiment shown, it is assumed that the casing wall 1 has a circular cross section when the squeezing force is not applied. The fluid can flow past the bracing element 4 through these bulges 9. After the elastic casing has been released, the casing automatically assumes its initial form about the bracing element 4 and closes off the conduit.

The valve can be actuated by hand by pressing the casing together. On the other hand, the valve can be actuated by the wearer of a mask using the teeth and pressing the casing together between the bracing elements (4, 5) for the condition wherein the conduit segment containing the valve is held in the mouth.

It is understood that the foregoing description is that of the preferred embodiments of the invention and that various changes and modifications may be made thereto without departing from the spirit and scope of the invention as defined in the appended claims.

What is claimed is:

1. A valve for a fluid-conducting conduit defining a fluid channel extending along a longitudinal axis, said conduit having a wall casing made of elastic material, the wall casing having inner and outer wall surfaces, the valve comprising:

two bracing elements arranged in spaced relationship to each other along said axis;

each of said bracing elements having a peripheral surface region in contact engagement with the inner wall surface for closing off said fluid channel; and, said bracing elements being spaced from each other a predetermined spacing distance to define a squeeze zone therebetween so as to cause a portion of said wall casing to deflect away from a portion of one of said peripheral surface regions in response to a squeeze force applied at said squeeze zone to the outer wall surface of said wall casing in a direction transverse to said axis and inwardly toward said fluid channel, said wall casing deflecting in a direction transverse to said squeeze force by bulging outwardly so as to cause said portion of said wall casing and said portion of one of said peripheral surface regions to conjointly define a pass-through opening to allow fluid in said conduit to pass through said valve.

2. The valve of claim 1, said predetermined spacing distance corresponding approximately to the spacing of said wall casing measured in a plane perpendicular to said longitudinal axis.

3. The valve of claim 1, said bracing elements being respective circular discs; and, said valve further comprising a strut disposed between said discs for connecting the latter to each other.

4. The valve of claim 1, one of said discs being arranged along said axis upstream of the other one of said discs; and, said one disc having aperture means formed therein to allow fluid to enter the space between said bracing elements.

5. The valve of claim 4, comprising recess means for accommodating said one disc therein.

6. The valve of claim 4, comprising recess means formed in said inner wall surface for accommodating one of said discs therein.

* * * * *